(12) United States Patent
Tachibana et al.

(10) Patent No.: US 9,169,156 B2
(45) Date of Patent: Oct. 27, 2015

(54) OPTICAL FIBER AND METHOD FOR MANUFACTURING THE SAME

(71) Applicant: SUMITOMO ELECTRIC INDUSTRIES, LTD., Osaka-shi, Osaka (JP)

(72) Inventors: Kumiko Tachibana, Kanagawa (JP); Takashi Fujii, Kanagawa (JP); Noriaki Iwaguchi, Kanagawa (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/248,574

(22) Filed: Apr. 9, 2014

(65) Prior Publication Data

US 2014/0308013 A1    Oct. 16, 2014

(30) Foreign Application Priority Data

Apr. 10, 2013    (JP) .................. 2013-082322

(51) Int. Cl.
*G02B 6/44*    (2006.01)
*C03C 25/10*   (2006.01)
*G02B 6/036*   (2006.01)
*G02B 6/02*    (2006.01)

(52) U.S. Cl.
CPC .......... *C03C 25/106* (2013.01); *C03C 25/1065* (2013.01); *G02B 6/02395* (2013.01); *G02B 6/036* (2013.01)

(58) Field of Classification Search
USPC ....................................................... 385/100
See application file for complete search history.

(56) References Cited

U.S. PATENT DOCUMENTS 5,804,313 A *   9/1998 Schell ........................... 428/391

FOREIGN PATENT DOCUMENTS

JP    S63-11550 A    1/1988

\* cited by examiner

*Primary Examiner* — Uyen Chau N Le
*Assistant Examiner* — Hoang Tran
(74) *Attorney, Agent, or Firm* — Drinker Biddle & Reath LLP

(57) ABSTRACT

The present invention relates to an optical fiber containing a glass fiber and a coating layer in contact with the outer circumference of the glass fiber, and a method for manufacturing the optical fiber, in which the coating layer contains silane coupling agents represented by the following formulae (1) and (2):

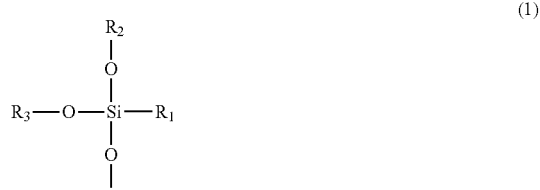

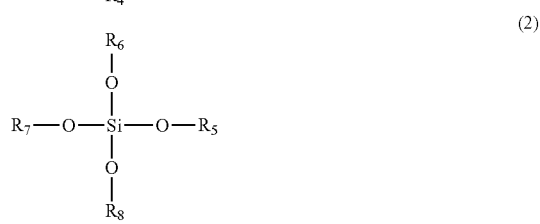

in the formulae, $R_1$ represents a group capable of reacting with an acryl group or an acryl group, and $R_2$ to $R_8$ are each the same or different and represent an alkyl group.

5 Claims, 1 Drawing Sheet

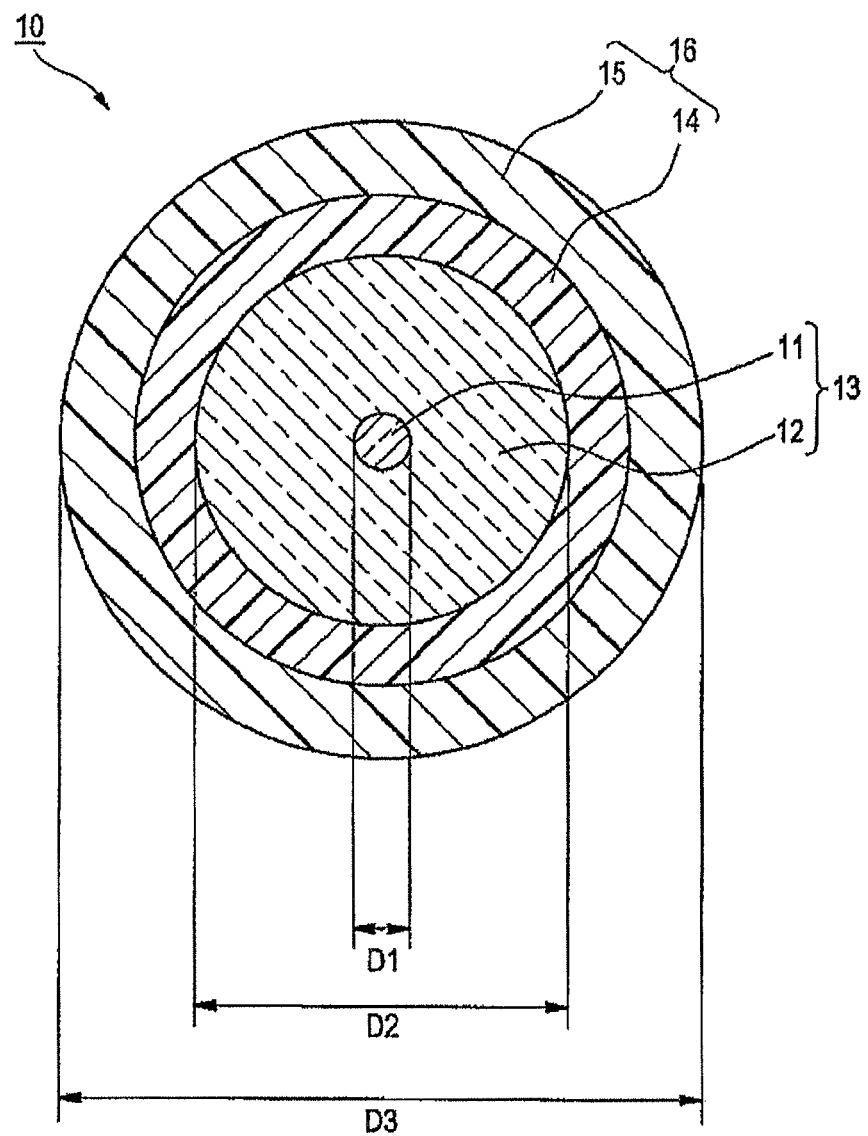

OPTICAL FIBER AND METHOD FOR MANUFACTURING THE SAME

TECHNICAL FIELD

The present invention relates to an optical fiber and a method for manufacturing the same.

BACKGROUND ART

An optical fiber having a structure that an optical bare fiber composed of a silica-based glass such as pure glass is coated with a resin layer is usually formed by melt-drawing a silica-based glass preform by means of a drawing apparatus to form an optical bare fiber and subsequently applying a curable resin composition on the outer circumference of the optical bare fiber by means of a coating die or the like, followed by curing. Moreover, the adhesion between the optical bare fiber and the coating layer has been improved by incorporating a silane coupling agent into the above curable resin composition.

In the case where the coating layer is formed of a material containing a silane coupling agent, strength deterioration is accelerated. In order to solve this problem, Patent Document 1 discloses a method of forming the coating layer on an optical bare fiber with the material containing the silane coupling agent, subsequently heating the layer under a high-humidity atmosphere, and then subjecting it to a drying treatment.

Furthermore, after the coating layer is formed of the curable resin composition containing the silane coupling agent on the outer circumference of the optical bare fiber, for example, the optical fiber is taken up on a bobbin.

Patent Document 1: JP-A-63-11550

SUMMARY OF THE INVENTION

However, it has been found that in the optical bare fiber taken up on the bobbin after the formation of the coating layer, tensile strength decreases (is deteriorated) during the storage.

The present invention is devised in consideration of the above problem on the conventional optical fiber, and an object of the present invention is to provide an optical fiber in which the tensile strength is not deteriorated even when the optical fiber is stored in a state that it is wound on a bobbin.

As a result of extensive studies for solving the above problem, the present inventors have found that the deterioration in tensile strength can be suppressed by the use of a compound having an alkoxy group with 2 or more carbon atoms even when the optical fiber is stored in a state that it is wound on a bobbin.

The present invention is accomplished based on the above findings.

That is, the present invention provides an optical fiber comprising a glass fiber and a coating layer in contact with the outer circumference of the glass fiber, and a method for manufacturing the optical fiber, in which the coating layer contains silane coupling agents represented by the following formulae (1) and (2)

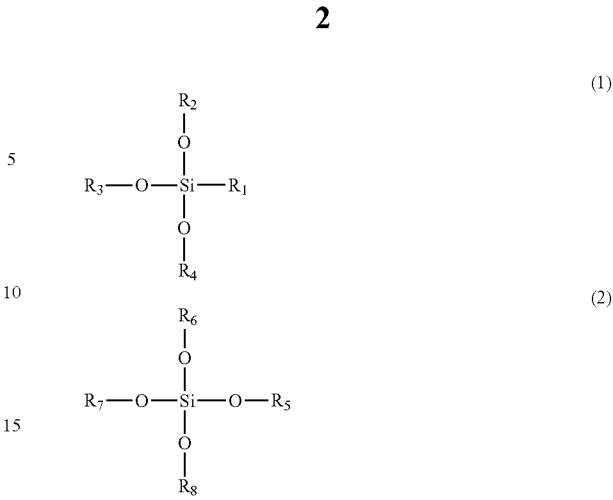

In the formulae (1) and (2), $R_1$ represents a group capable of reacting with an acryl group by ultraviolet irradiation or an acryl group, and $R_2$ to $R_8$ are each the same or different and represent an alkyl group having 2 or more carbon atoms.

According to the above-described invention, there can be manufactured an optical fiber in which the tensile strength is not deteriorated even when the optical fiber is stored in a state that it is wound on a bobbin.

BRIEF DESCRIPTION OF THE DRAWINGS

FIG. 1 is a schematic cross-sectional view showing one example of the optical fiber of the present invention.

MODE FOR CARRYING OUT THE INVENTION

The present invention provides an optical fiber comprising a glass fiber and a coating layer (first coating layer) in contact with the outer circumference of the glass fiber and a method for manufacturing the same, in which the coating layer is formed of a resin composition containing silane coupling agents represented by the following formulae (1) and (2):

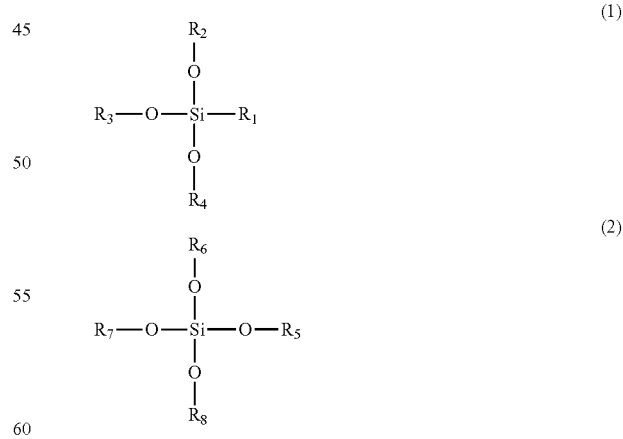

In the formulae (1) and (2), $R_1$ represents a group capable of reacting with an acryl group by ultraviolet irradiation or an acryl group, and $R_2$ to $R_8$ are each the same or different and represent an alkyl group having 2 or more carbon atoms.

When the resin composition for forming the coating layer contains the silane coupling agents represented by the above-mentioned formulae (1) and (2), the tensile strength of the optical fiber is not deteriorated even when the optical fiber is stored in a state that it is wound on a bobbin.

It is preferable that $R_5$ to $R_8$ are each the same or different and are an alkyl group having 3 or more carbon atoms.

It is preferable that the ratio of the silane coupling agent represented by the general formula (1) to the silane coupling agent represented by the general formula (2) in the coating layer is 1:11 to 11:1. This is because an effect of suppressing the deterioration of the tensile strength of the optical fiber to be manufactured is further improved and the adhesion between the coating layer(s) and the glass fiber or pull-out force of the coating layer(s) becomes satisfactory. The ratio of two kinds of the silane coupling agents in the thus manufactured optical fiber becomes about the same as the ratio at the time of initial blending and is from 1:11 to 11:1.

It is further preferable that another coating layer (second coating layer) is further formed outside the first coating layer and the ratio of the silane coupling agent represented by the general formula (1) to the silane coupling agent represented by the general formula (2) in the first coating layer in contact with the outer circumference of the glass fiber is 1:2 to 2:1. This is because an optical fiber satisfactory in both of the adhesion and pull-out force can be manufactured. The ratio of two kinds of the silane coupling agents in the thus manufactured optical fiber becomes about the same as the ratio at the time of initial blending and is from 1:2 to 2:1.

The following will describe an embodiment of the present invention in detail.

In the embodiment of the present invention, a coating layer is formed by coating the outer circumference of an optical bare (glass) fiber composed of silica glass with a radiation-curable resin composition and curing it.

For example, there may be mentioned a method of applying the radiation-curable resin composition around an optical bare fiber obtained by melt-drawing a silica-based glass preform and curing the resin composition through irradiation with an ultraviolet ray in an ultraviolet irradiation apparatus, as one specific embodiment.

The radiation-curable resin composition for formation of the coating layer to be used in the embodiment of the present invention contains the silane coupling agents represented by the above general formulae (1) and (2).

Silane Coupling Agents $R_1$ in the general formula (1) represents a group capable of reacting with an acryl group by ultraviolet irradiation or an acryl group. Examples of the group capable of reacting with an acryl group by ultraviolet irradiation include a mercapto group, a mercaptoalkyl group, and the like.

$R_2$ to $R_8$ in the general formulae (1) and (2) are each the same or different and are not particularly limited as long as they are an alkyl group having 2 or more carbon atoms but preferably have each 4 or less carbon atoms.

As $R_2$ to $R_8$, an ethyl group, a propyl group, a butyl group, and the like may be specifically mentioned.

$R_5$ to $R_8$ are further preferably an alkyl group having 3 or more carbon atoms.

Specific examples of the silane coupling agent represented by the general formula (1) include 3-mercaptopropyltriethoxysilane, acryltriethoxysilane, 3-mercaptopropyltripropoxysilane, acryltripropoxysilane, and the like.

Specific examples of the silane coupling agent represented by the general formula (2) include tetraethoxysilane, tetrapropoxysilane, and the like. When $R_5$ to $R_8$ are an alkyl group having 3 or more carbon atoms, such as the case of tetrapropoxysilane, an alcohol formed by hydrolysis of the silane coupling agent is large one having 3 or more carbon atoms, which does not enlarge a defect of glass, and the tensile strength of the optical fiber is further improved, so that the case is preferable.

In the above radiation-curable resin composition, the use ratio of the silane coupling agent represented by the general formula (1) to the silane coupling agent represented by the general formula (2) is preferably from 1:11 to 11:1 as a mass ratio. Moreover, it is more preferable that the optical fiber of the embodiment of the present invention further has another coating layer (second coating layer) outside the first coating layer formed of the above resin composition and the ratio of the silane coupling agent represented by the general formula (1) to the silane coupling agent represented by the general formula (2) contained in the resin composition is from 1:2 to 2:1.

Moreover, total content of the silane coupling agents represented by the general formulae (1) and (2) in the radiation-curable resin composition is not particularly limited but is preferably from 0.5 to 5.0% by mass.

Base Resin

The above radiation-curable resin composition contains a base resin in addition to the above silane coupling agents.

The base resin is not particularly limited as long as it has radiation curability but preferably contains an oligomer, a monomer, and a photoinitiator.

Examples of the oligomer include a urethane acrylate, an epoxy acrylate, and a mixed system thereof.

Examples of the urethane acrylate include those obtained by reacting a polyol compound, a polyisocyanate compound, and a hydroxyl group-containing acrylate compound.

Examples of the polyol compound include polytetramethylene glycol, polypropylene glycol, and the like. Examples of the polyisocyanate compound include 2,4-tolylene diisocyanate, isophorone diisocyante, and the like. Examples of the hydroxyl group-containing acrylate compound include 2-hydroxy acrylate, 2-hydroxybutyl acrylate, 1,6-hexanediol monoacrylate, pentaerythritol triacrylate, 2-hydroxypropyl acrylate, and the like.

Examples of the monomer include an N-vinyl monomer having a cyclic structure, such as N-vinylpyrrolidone, N-vinylcaprolactam, or acryloylmorpholine. When these monomers are contained, a curing rate is improved, so that the case is preferred. Besides, there may be used a monofunctional monomer such as isobornyl acrylate, tricyclodecanyl acrylate, benzyl acrylate, dicyclopentanyl acrylate, 2-hydroxyethyl acrylate, phenoxyethyl acrylate, or polypropylene glycol monoacrylate; or a polyfunctional monomer such as polyethylene glycol diacrylate or tricyclodecanediyldimethylene diacrylate.

Examples of the photoinitiator include 1-hydroxycyclohexyl phenyl ketone, 2,2-dimethoxy-2-phenylacetophenone, 1-(4-isopropylphenyl)-2-hydroxy-2-methylpropan-1-one, 2,4,4-trimethylpentylphosphine oxide, and the like. Moreover, antioxidant, photosensitizer, and the like may be added.

Optical fiber Manufactured by Embodiment of the Present Invention

FIG. 1 shows one embodiment of the optical fiber manufactured by the embodiment of the present invention. An optical fiber 10 has a coating layer 16 including an inner layer 14 formed of the radiation-curable resin composition for coating layer formation of the embodiment of the present invention, on the outer circumference of a glass fiber 13 composed of silica glass. The glass fiber 13 is composed of a core part 11 and a cladding part 12. For example, silica to which germanium had been doped can be used as the core part and pure silica or silica to which fluorine had been doped can be used as the cladding part.

In FIG. 1, for example, the diameter (D2) of the glass fiber 13 is about 125 μm. Also, the diameter (D1) of the core part 11 is preferably from about 7 to about 15 μm. The coating layer 16 is composed of two layers of the inner layer 14 and an outer layer 15 and the thickness of the inner layer 14 is from 12 to 45 μm. The coating layer (first coating layer) containing the silane coupling agents is the inner layer 14 and the elastic modulus thereof is preferably 0.8 MPa or less. Outside the layer, the outer layer 15 (second coating layer) that is a coating layer having an elastic modulus of 600 to 1,500 MPa may be provided to increase mechanical strength.

EXAMPLE

The following will describe the present invention in further detail with showing results of evaluation tests using Examples according to the present invention and Comparative Example. Incidentally, the present invention should not be construed as being limited to these Examples.

Preparation of Optical Fiber 10

A glass fiber containing silica as a main component and having a core diameter (D1) of 8 μm and a cladding diameter (D2) of 125 μm (relative refractive index difference Δn: 1.0%) was used as a glass fiber 13. The outer circumference of the glass fiber 13 was coated, in accordance with the above-described method, with two layers (inner layer 14 and outer layer 15) as the coating layer 16 obtained by curing the following ultraviolet-curable resin composition, to thereby prepare an optical fiber 10 in which an outer diameter (D3) of the outer layer 15 was 250 μm.

Ultraviolet-Curable Resin Composition for Constituting Coating Layer 16

A base resin was prepared by blending an oligomer obtained by reacting polypropylene glycol, 2,4-tolylene diisocyanate and 2-hydroxyethyl acrylate in a ratio of about 1:2:2, with N-vinylcaprolactam and isobornyl acrylate as monomers. To 100 parts by mass of the base resin was added 1 part by mass of 2,4,4-trimethylpentylphosphine oxide as a photoinitiator, thereby preparing a resin composition.

Incidentally, to a resin composition for inner protective coating layer (inner layer 14) formation, those described in the following Table 1 were added as silane coupling agents so as to achieve the addition amounts described in Table 1.

Evaluation of Optical Fiber 10

For the prepared optical fibers, the following evaluation tests (tensile strength, strippability, degree of cure) were conducted. Results are shown in Table 1.

Measurement of Tensile Strength

Using a tension tester, tensile strength of the optical fiber was measured in accordance with the prescription of Teccordia GR-20-CORE.

The tensile strength was measured for the optical fiber after 7 days and after 90 days from the manufacture. Storage environment and measurement environment were 23° C. and 50%. The case of less than 5.5 kg was ranked as B and the case of 5.5 kg or more was ranked as A.

Evaluation Method of Strippability

A cut was made into the resin coating layer of the optical fiber by means of a razor blade at such a depth that the edge of the blade did not reach the glass surface. One side of the resin coating layer beside the cut was attached to a board and the board was fixed. Then, another side of the optical fiber was gripped and drawn. The strippability at the time when the glass fiber (glass part) was pulled out from the resin coating layer fixed to the board was measured. The case of less than 0.6 kg was ranked as C, the case of 0.6 kg or more and less than 1.0 kg was ranked as B, and the case of 1.0 kg or more and less than 1.5 kg was ranked as A.

Evaluation Method of Degree of Cure

After the optical fiber was immersed in methyl ethyl ketone (MEK) at 60° C. for 17 hours, the fiber was thoroughly dried and weighed and a gel fraction was determined according to the following equation. The case where the gel fraction was less than 90% was ranked as B and the case of 90% or more was ranked as A.

Gel fraction=(Coating weight after extraction/Coating weight before extraction)×100

TABLE 1

|  | No. 1 | No. 2 | No. 3 | No. 4 | No. 5 |
| --- | --- | --- | --- | --- | --- |
| 3-Mercaptopropyltriethoxysilane (formula (1)) (wt %) | 0.6 | 0.4 | 0.1 | 1.1 | — |
| Tetraethyl silicate (formula (2)) (wt %) | 0.6 | 0.8 | 1.1 | 0.1 | — |
| Mercaptopropyltrimethoxysilane | — | — | — | — | 1.2 |
| Tensile strength after 7 days from manufacture | A | A | A | A | A |
| Tensile strength after 90 days from manufacture | A | A | A | A | B |
| Strippability | A | B | C | C | C |
| Degree of Cure | A | A | A | B | B |

In the above Table 1, Nos. 1 to 4 are Examples and No. 5 is Comparative Example.

As can be seen from the results shown in the above Table 1, in the cases of Nos. 1 to 4 where the resin compositions containing silane coupling agents represented by the above general formulae (1) and (2) were used, it was possible to obtain optical fibers in which the tensile strength was not deteriorated even after 90 days of storage. Moreover, in the case of Nos. 1 and 2 where the ratio of the silane coupling agent represented by the general formula (1) to the silane coupling agent represented by the general formula (2) was from 1:2 to 2:1, it was possible to obtain highly reliable optical fibers having further satisfactory strippability and degree of cure.

On the other hand, in No. 5 where both of the silane coupling agents represented by the general formulae (1) and (2) were not used, the tensile strength after 90 days of storage was deteriorated and the strippability and degree of cure were also bad.

While the present invention has been described in detail and with reference to specific embodiments thereof, it will be apparent to one skilled in the art that various changes and modifications can be made therein without departing from the spirit and scope thereof.

Incidentally, the present application is based on a Japanese patent application No. 2013-082322 filed on Apr. 10, 2013, the entirety of which is incorporated by reference. In addition, all references cited herein are incorporated as a whole.

DESCRIPTION OF REFERENCE NUMERALS AND SIGNS

10: Optical fiber
11: Core part
12: Cladding part
13: Glass fiber
14: Inner layer (first coating layer)
15: Coating (outer) layer (second coating layer)
16: Coating layer

What is claimed is:

1. An optical fiber comprising a glass fiber and a coating layer in contact with the outer circumference of the glass fiber, wherein the coating layer contains silane coupling agents represented by the following formulae (1) and (2):

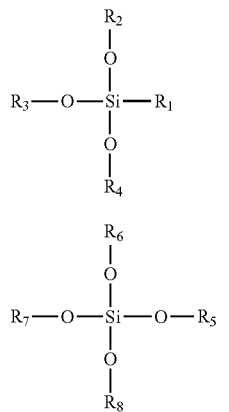

wherein $R_1$ represents a group capable of reacting with an acryl group by ultraviolet irradiation or an acryl group, and $R_2$ to $R_8$ are each the same or different and represent an alkyl group having 2 or more carbon atoms wherein the ratio of the silane coupling agent represented by the general formula (1) to the silane coupling agent represented by the general formula (2) in the coating layer is 1:11 to 11:1.

2. The optical fiber according to claim 1, wherein $R_5$ to $R_8$ are each the same or different and are an alkyl group having 3 or more carbon atoms.

3. A method for manufacturing an optical fiber containing a glass fiber and a coating layer, comprising forming the coating layer so as to come into contact with the outer circumference of the glass fiber,
wherein the coating layer is formed of a resin composition containing silane coupling agents represented by the following formulae (1) and (2):

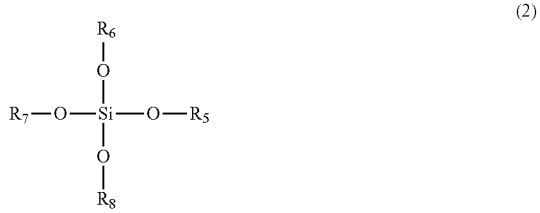

wherein $R_1$ represents a group capable of reacting with an acryl group by ultraviolet irradiation or an acryl group, and $R_2$ to $R_8$ are each the same or different and represent an alkyl group having 2 or more carbon atoms wherein the ratio of the silane coupling agent represented by the general formula (1) to the silane coupling agent represented by the general formula (2) in the coating layer is 1:11 to 11:1.

4. The method for manufacturing an optical fiber according to claim 3, wherein $R_5$ to $R_8$ are each the same or different and an alkyl group having 3 or more carbon atoms.

5. The method for manufacturing an optical fiber according to claim 3, further comprising forming another coating layer on outside the coating layer, wherein the ratio of the silane coupling agent represented by the general formula (1) to the silane coupling agent represented by the general formula (2) in the coating layer in contact with the outer circumference of the glass fiber is 1:2 to 2:1.

* * * * *